2,935,372
Patented May 3, 1960

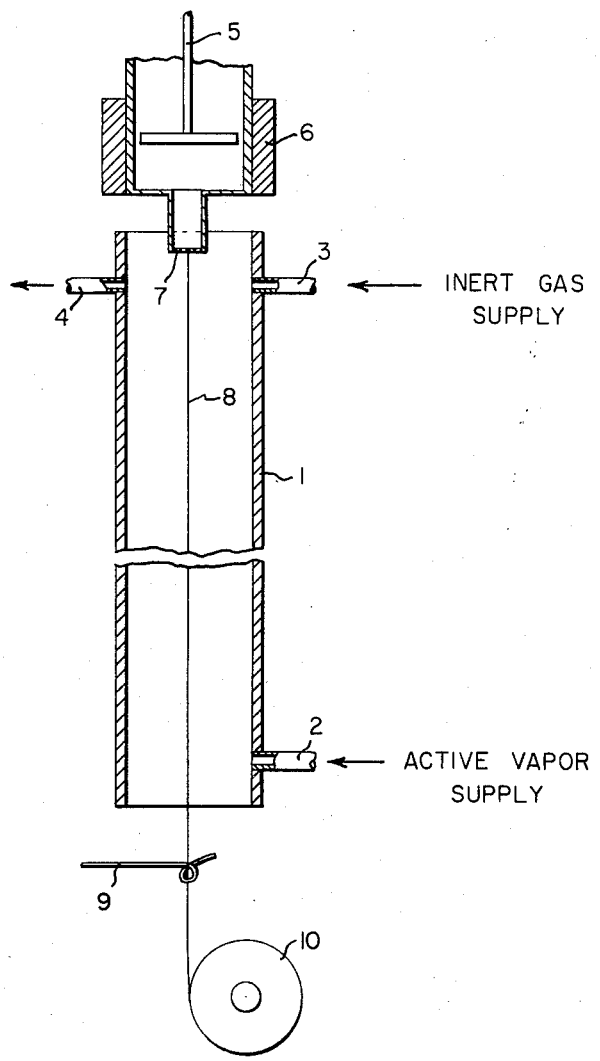

2,935,372

PROCESS OF PRODUCING SHAPED BODIES BY COMBINING REACTIVE INTERMEDIATES, AT LEAST ONE OF WHICH INTERMEDIATES IS IN THE VAPOR PHASE

Walter Steuber, Media, Pa., assignor to E. I. du Pont de Nemours and Company, Wilmington, Del., a corporation of Delaware Application February 21, 1955, Serial No. 489,684

14 Claims. (Cl. 18—54)

This invention relates to a process. More particularly it concerns a process for forming a shaped body having a continuous cross section, by combination of two complementary reactive polymer intermediates, the said combination being accomplished by extruding one of the said intermediates into the vapor of the other.

It is an object of the present invention to provide a process for the production of a shaped body of continuous cross section by combination of two complementary reactive polymer intermediates, one of which is a vapor.

Another object is to provide a process for the production of a shaped body of continuous cross section by combination of two complementary reactive polymer intermediates, one of which has a viscosity of at least 20 poises while its complement is gas embodied.

These and other objects will become apparent in the course of the following specification and claims.

In accordance with the present invention a process is provided which comprises forming a solid shaped body of continuous cross section by combining at least two complementary reactive intermediates, one of which contains at least two active hydrogens, more reactive than alcoholic hydrogen, whereas its complement contains at least two reactive groups from the class consisting of a group capable of reacting with alcohol at room temperature to form an ester, the methyl oxalate group and the phenyl oxalate group and at least one of the said complementary reactive polymer intermediates being a multifunctional organic macromolecule of recurring units which can possess a viscosity of at least about 20 poises and at least one of the said complementary intermediates being monomeric and vaporous, the combination of the said complementary intermediates being accomplished by extruding the macromolecular intermediate into the vapors of the monomeric intermediate.

The complementary polymer intermediates correspond to the formulae:

$$R—(X)n$$
$$R'—(Y)n$$

wherein $n$ is a small number greater than 1, X is hydrogen more active than alcoholic hydrogen, Y is a group capable of reacting with alcohol at room temperature to form an ester, methyl oxalate or phenyl oxalate, R and R' are different organic radicals such that one of the said complementary reactants is a macromolecule of recurring units which can have a viscosity of at least about 20 poises and the other of the said complementary reactants is a monomeric polymer intermediate which can exist in the vaporous state.

By the expression "a solid shaped body of continuous cross section" is meant a solid structure in the nature of a filament or film whose cross section is uniform and unbroken and opposed to structures which have soft or hollow centers. The term "polyfunctional" indicates the presence upon the molecule of at least two reactive groups capable of reaction with a complementary functionally substituted molecule to form a polymer under conditions of the present invention. The expression "polymer . . . intermediate" denotes a molecule polyfunctionally substituted and capable of reacting with a complementary polyfunctionally substituted molecule to form a polymer under reaction conditions of the present invention. By a "macromolecule of recurring units which can possess a viscosity of at least about 20 poises" is meant a polymeric type organic material which is capable of being dissolved or suspended in fine particle form in an inert solvent in relatively high concentration to produce a liquid having a viscosity of at least about 20 poises as well as a polymeric type organic compound which is a liquid having a viscosity of at least 20 poises at a temperature less than its point of substantial decomposition. By an intermediate ". . . monomeric and vaporous" is meant a polyfunctional organic compound of low molecular weight, i.e., monomer, dimer, etc., capable of being vaporized without substantial decomposition or capable of being atomized in a gaseous stream to produce a suspension of at least about 1000 parts per million. The term "inert gas" is used to signify a gas which is inert to both reactants under the process conditions employed.

The invention will be more readily understood by reference to Figure 1 wherein apparatus suitable for practicing the process of the present invention is illustrated. A spinning tube 1, is equipped with an active vapor inlet 2, an inert gas inlet 3 and a gas exhaust 4. An extrusion unit comprising a plunger 5 in a polymer reservoir 11 which is encased in heating block 6. Pressure upon the plunger forces the liquid polymer intermediate through the spinneret plate 7. The stream of liquid polymer intermediate issuing from the spinneret plate enters the spinning tube and after passing through a zone of inert gas supplied at inlet 3, contacts and reacts with the active vapor, supplied at inlet 2, to form filament 8. The formed filament is collected on take-up wheel 10 through filament guide 9. A vacuum exhaust device is frequently desirable at gas exhaust 4.

The following examples are cited to illustrate the invention. They are not intended to limit it in any manner. The invention has particular value in the preparation of articles having high elasticity. In reporting this property those structures are included which exhibit elastic recoveries above 90% and stress decays below 20%. Elastic recovery is the percentage return to original length within one minute after the tension has been released from a sample which has been elongated 50% at the rate of 100% per minute and held at 50% elongation for one minute. Stress decay is the percent loss in stress in a yarn one minute after it has been elongated to 50% at the rate of 100% per minute.

*Example I*

A polyamide prepolymer is prepared by reacting 21.6 parts of an 85.6% solution of pure hexamethylenediamine in water with 30.08 parts of azelaic acid and 2.62 parts of 3,3'-imino-bis(propylamine) in a large polymer tube by heating for 20 hours at 245° C., followed by a 3-hour vacuum cycle at 245° C. with a final pressure of 0.2 mm. mercury. The product of this reaction is a polyamide with a molecular weight of about 3000, polymer melt temperature of about 200° C. and essentially all terminal reactive groups being amino groups. This prepolymer is inserted in a press spinning machine, heated to slightly above the melting point, and extruded through a No. 26 hypodermic needle into a glass tube 2 inches in diameter and 24 inches long which is heated to approximately 100° C. Vapors of toluene diisocyanate are introduced into the glass tube as the polyamide prepolymer is extruded. Upon contacting the toluene diisocyanate, the prepolymer forms a filament that is solid, smooth, lustrous, and upon withdrawing from the reaction tube proves to be cold-drawable and have a slightly rubbery feeling.

*Example II*

A portion of the same prepolymer described in Example I is placed in a press spinning machine, heated above the melting point and extruded through a hypodermic needle into a double-walled glass tube in which the outer wall is filled with circulating hot air at 250° C. The double-walled tube is 16 inches long and the inner tube is filled with gaseous phosgene which upon contacting the extruding material reacts with it to give a rubbery continuous filament. This filament, when cooled to room temperature, is no longer rubbery but exhibits the phenomenon of cold drawability.

*Example III*

In an experiment similar to that described in Example II, liquid hexamethylene diisocyanate is sprayed onto the interior walls of the inner glass tube. The liquid toluene diisocyanate vaporizes as it contacts the hot glass, and when the vapors contact the polyamide being extruded through the spinneret, a filament forms which is rubbery and continuous as before. On cooling to room temperature, this filament is no longer rubbery, but is cold-drawable.

*Example IV*

A prepolymer is prepared in the two steps as follows:
(a) [Polytetramethylene oxide] glycol of the formula

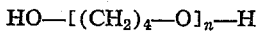

wherein $n$ is an integer large enough to give a molecular weight of approximately 1000 is placed in a 5-liter flask blanketed with nitrogen gas and kept under agitation and reacted with toluene diisocyanate in the ratio of 2660 parts of the glycol to 261 parts of the isocyanate. The reaction mixture was stirred for 3 hours at 98° C. and on cooling a thick viscous (350 poises) liquid is obtained which upon analysis is found to have 580 hydroxyl ends per million grams and 3 isocyanate ends per million grams corresponding to an average molecular weight of 3450 with almost entirely hydroxyl ends. The material represents an average trimer of the polyglycol and will be referred to as trimer.

(b) 77.5 parts of the above-described trimer is placed in a test tube and 8.02 parts of toluene diisocyanate added and stirred. The reaction mixture is stirred under nitrogen over a steam bath for 3 hours and 15 minutes. The result is a thick viscous sticky liquid. This material is placed in a hypodermic syringe and extruded through a No. 20 needle at approximately 500 pounds per square inch pressure into ethylenediamine vapor. The tip of the needle is held approximately ¾ inch above the top of the tube which contains the ethylenediamine vapor. This ¾ inch space is sufficient to provide a blanketing of inert gas, in this case air, to protect the tip of the spinneret from the reactive ethylenediamine. The diamine is obtained in the vapor form by bubbling nitrogen gas through liquid ethylenediamine at 30° C. Concentration of ethylenediamine is approximately 3000 parts per million. From this tube spinning, yarn is obtained with a tenacity of 0.13 gram/denier and an elongation of 609%. When this same viscous prepolymer is placed in a modified acetate-type spinning cell as illustrated in Figure 1 and the material is extruded through an 8-mil, one-hole spinneret into the spinning chamber containing ethylenediamine vapors premixed with nitrogen at approximately the same concentration as above, a solid filament is formed which could be wound up at speeds varying from 50 to 175 y.p.m. The yarn, when tested, is found to have a tenacity of 0.2 gram per denier, elongation of 500% and a 94% recovery from tensile elongation.

*Example V*

A portion of the same trimer as described in Example IV is reacted with p,p'-methylene diphenyl diisocyanate in a manner similar to the procedure described in Example IV to provide again a thick viscous sticky liquid. This material is transferred to a spinning cell, spun through a 10-mil spinneret with the liquid being held at 60° C. with ethylenediamine in the spinning cell in a gaseous mixture with nitrogen containing 3 to 50 thousand parts per million of ethylenediamine. The reaction proceeds sufficiently fast to permit continuous spinning at 40 y.p.m. and the resultant solid yarn is wound up and tested. It is found to have a tenacity of 0.2 of a gram per denier, elongation of 400% and recovery from tensile elongation of 99%.

*Example VI*

One hundred parts of polytetramethylene oxide glycol with an initial molecular weight of approximately 1000 is combined with 27.9 parts of toluene diisocyanate and the mixture is stirred together for 3 hours at 80° C. under a nitrogen blanket. A moderately viscous material results with predominantly diisocyanate ends. This material is placed in a hypodermic syringe and extruded through a needle into a vapor from boiling dimethyl-piperazine with the result that short lengths of solid filaments are formed.

*Example VII*

In an experiment similar to that performed in Example VI above, a quantity of polytetramethylene oxide glycol is combined with an excess of toluene diisocyanate to give a predominantly isocyanate-ended dimer and the resulting viscous liquid is extruded into vapors from boiling piperazine. Again filaments are formed.

*Example VIII*

A portion of isocyanate-ended trimer similar to that used in Example IV is shaped into a filamentary form by drawing out a string from a dab of the prepolymer. When this action is performed in an atmosphere of gaseous hexamethylenediamine, obtained by boiling some liquid hexamethylenediamine in a hot plate directly below the filament, a rubbery solid dry filament is obtained which is strong enough to be self-supporting.

*Example IX*

A reaction similar to that described above in Example VIII is performed using instead of hexamethylenediamine, diethylene triamine, and again a rubbery dry filament is formed.

*Example X*

An experiment similar to Example VIII is performed using, instead of hexamethylenediamine, triethylene tetramine, and again a rubbery dry filament is obtained.

*Example XI*

This example shows the use of a viscous liquid reactant obtained by thickening a solution of a monomeric reactant. A 30% solution of p,p'-methylene diphenyl isocyanate in dimethyl formamide is prepared. Since this solution is too thin to extrude easily, it is thickened by incorporating some polymeric product of a reaction between p,p'-methylene diphenyl diisocyanate and 2.5 dimethyl piperazine. The polymer is compatible with the diisocyanate and produces a clear, viscous solution (20 poises) which can be extruded readily through a spinneret. The viscous solution contains 8% of a low molecular weight polymer, 25% p,p'-methylene diphenyl diisocyanate, and 65% solvent. The thickened monomer solution is extruded through a spinneret into a reactive vapor consisting of a mixture of ethylene diamine and nitrogen, obtained by bubbling nitrogen through a bath of anhydrous ethylene diamine. The product of the solution is removed from the vapor chamber in the form of a springy solid filament.

Example XII

A sample of polyamide prepolymer, similar to that described in Example I, is extruded into dimethyl oxalate vapor. The reaction produces cold-drawable filaments, with a tenacity of 0.16 grams per denier, and an elongation (to the break) of 29%.

Example XIII

A polyethylene oxide glycol tripolymer, linked with toluene diisocyanate and terminating in p,p'-methylene diphenyl diisocyanate residues similar to the viscous liquid described in Example V is mixed with one-half its volume of triethylamine and extruded into vapors of diethylene oxide dithiol, formula

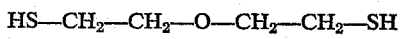

$$HS-CH_2-CH_2-O-CH_2-CH_2-SH$$

The reaction product is obtained in the form of continuous elastic, but slightly tacky filaments.

Example XIV

A portion of the same diisocyanate-ended polyglycol described in Example XIII is extruded into vapors of pentamethylene dithiol mixed with 20% triethylamine. As before, elastic filaments are formed.

Example XV

A portion of amine-ended polyamide is prepared from hexamethylene diamine and azelaic acid in a manner similar to that described in Example I, except that no trifunctional compound is added. The material is extruded into a tube 16 inches long, heated to 230° C. When the column is filled with hot air, the polyamide can not be spun into fibers. Hot vapors of toluene diisocyanate are introduced by bubbling nitrogen gas into hot liquid toluene diisocyanate, and circulating the resulting mist to the column. The mist particles of toluene diisocyanate vaporize and react with the polyamide to give a fiber which, when cold-drawn to four times its original length, has a tenacity of 1.7 grams per denier and an elongation of 12%.

The polymer comprising the final shaped article may be of the linear, cross-linked or a combination of the two varieties. Furthermore, the polymeric product, regardless of its variety of linkage, may be of a coupled type, i.e. only one of each of two complementary intermediates is used in its production, or segmented, i.e. a mixture of at least two homofunctional species of one intermediate is reacted with one or more species of complementary homofunctional intermediates. In the formation of the segmented products the speed of reaction between the various complementary intermediates is preferably substantially equal. It is preferable that the speed of reaction of the fastest reacting complementary intermediates be close to the speed of reaction of the slowest reacting complementary intermediates in any particular system.

The complementary reactive polymer intermediates are combined in accordance with the present invention, by extruding at least one such intermediate having a viscosity of at least about 20 poises through an orifice into the vapors of its complement and the shaped article formed is led away as it forms to a reel or other suitable conventional dry-spinning collecting means. The phase extruded contains the macromolectular intermediate. For spinning fibers extrusion may be through a conventional dry-spinning spinneret. A spinneret providing an orifice of about 3 to about 10 mils is preferred although orifices of larger diameter may be employed. A needle-type spinneret is frequently advantageous. Furthermore, orifices of shapes other than round are suitable. A slotted orifice may be used to produce films and ribbons. The shaped article may be washed, stretched, lubricated or otherwise after-treated.

In general, the temperature at which the complementary polymer intermediates are contacted may vary over a wide range depending primarily on the nature of the intermediates employed. Temperatures over the range of 30° C. to 100° C. have been employed. The spinning tube 1, of Figure 1 may be equipped with temperature control means where desired. The viscosity of the macromolecular intermediate may be due in part to non-reactive, inert diluents such as liquid polymers, glycols, pigmentation and the like but is preferably due to the degree of polymerization of the macromolecular intermediate per se.

Preferably the macromolecular complementary reactive intermediate is a liquid with a viscosity of at least about 20 poises under the conditions of the reaction. However it may be dissolved or suspended in a liquid diluent to give an extrudable fluid of satisfactory viscosity characteristics. The temperature at which the liquid is extruded is not critical provided excessive decomposition of the intermediate is avoided. When diluents are employed it is preferred that the total concentration of the macromolecular intermediate be at least about 35% by weight of extruded material. Use of higher concentrations promotes compactness of the polymeric structure and reduces the problems associated with handling large volumes of solvents, particularly the organic solvents, which tend to be toxic, expensive, inflammable, etc. Satisfactory solid products can be obtained by using lower concentrations for some sets of complementary intermediates.

The speed at which the formed solid shaped products can be collected will depend upon the specific reactants and reaction conditions, such as the diluents used whether liquid or gaseous and the concentration of the reactants in these diluents.

Useful inert diluents for diamines include dioxan, benzene, tetrahydrofuran, and the like. Suitable inert materials for diluting acid halides, such as acid chlorides and chloroformates, include benzene, toluene, xylene, cyclohexane, trichloroethylene, chlorobenzene, nitrobenzene, heptane, isooctane, diethyl ether, ethyl acetate, methyl amyl ketone, ethylene dichloride, carbon tetrachloride, chloroform, etc. Diluent for the gaseous intermediate may be an inert gas such as nitrogen. Air is often satisfactory. It is essential that the diluents be materials which do not react as readily with either polymer-forming intermediate as does its complementary intermediate, and thus reduce the probability of polymer formation. When a diluent is employed with the monomolecular polymer intermediate, it is preferable that the monomolecular intermediate contribute at least one tenth of one percent of the partial pressure of the mixture in the gaseous state. However, a partial pressure of monomolecular intermediate as low as one hundredth of one percent of the total pressure is usually satisfactory. The use of higher concentrations of the monomolecular intermediate is highly desirable. The mixture of inert diluent and monomolecular intermediate can be accomplished by bubbling the inert gas through the liquid monomolecular intermediate, by atomizing the monomolecular intermediate into the gas stream or by spraying or flowing the monomolecular intermediate upon the walls of the spinning tube at such temperature and in such concentrations that its vapors contact the macromolecular intermediate.

While a cross flow of inert gas at the spinneret face as illustrated in the figure is highly desirable to prevent reaction immediately contiguous to the spinneret face, such a provision is not essential.

As previously defined, one of the complementary polymer intermediates contains at least two active hydrogens more reactive than alcoholic hydrogen, i.e. the hydrogen of an alkanol. Among end groups providing such a hydrogen may be mentioned —SH, phenolic —OH, amino —NHR (in which R is H or alkyl) and amidino.

The other complementary polymer intermediate contains at least two reactive groups capable of reacting with alcohol to form an ester. Among such groups may be mentioned the acid chloride group, the chloroformate group and the isocyanate group. The use of complementary polymer intermediates which form a self-supporting polymeric structure within 10 seconds after combination at room temperature is preferred. A large variety of suitable such combinations is illustrated in copending U.S. application Ser. No. 226,066, filed May 12, 1951, now Pat. No. 2,708,617.

The multifunctional organic macromolecular intermediate may consist of a member of the class consisting of a hydrocarbon polymer, a polyether, a polythioether and a polymer containing an amide-type linkage, equipped if desired or necessary with functional end groups as required by the conditions of the reaction. Thus the carbon skeleton may be a hydrocarbon polymer, such as polyethylene, which has been provided with reactive groups by a suitable reaction. It is also possible to utilize polymers prepared from vinyl monomers containing groups which are not reactive under the conditions used, such as the ester groups in vinyl acetate, by forming copolymers with vinyl monomers containing very reactive groups, such as the acid chloride groups of acrylyl chloride. The use of small percentages of the acid chloride in the copolymeric macrointermediate permits formation of a final polymer containing sufficiently few crosslinks that the shaped structures are readily deformable. Furthermore, low molecular weight polyisoprene, polybutadiene, and similar derivatives terminated with amine groups can be utilized readily in the process of the present invention. Representative macromolecular intermediates of this class are described more fully in U.S. 2,647,146. Another method of obtaining hydrocarbons with reactive ends is to oxidize butadiene-isobutylene copolymers containing small percentages of butadiene with nitric acid. The products isolated are essentially polyisobutylene with carboxyl ends, which can be converted to acid halides for use in this process.

Representative polyethers which may be used include the polyoxathiaalkylene glycols, such as poly(1,6-dioxa-9-thiahendecane), poly(1,4-dioxa-7-thianonane), and poly(1-oxa-4-thiahexane); the poly(alkylene oxide) glycols, such as poly(ethylene oxide) glycol, poly(propylene oxide) glycol, poly(tetramethylene oxide) glycol, and poly(decamethylene oxide) glycol; polydioxolane and polyformals prepared by reacting formaldehyde with other glycols or mixtures of glycols, such as tetramethylene glycol and pentamethylene glycol, and copolyethers derived from more than one glycol. Some of the alkylene radicals in these polyethers may be substituted by arylene and/or cycloaliphatic radicals. Multifunctional polyethers and thioethers may also be used.

Aliphatic glycols must be provided with hydrogen end groups which are more reactive than the hydrogen of alcoholic hydroxyl or with an end group capable of reacting with alcohol at room temperature to form an ester. Amine ends can be provided by reacting the glycols with acrylonitrile and reducing. The acid halide ends may be made by reacting the glycol with two mols of a diacid halide. The chloroformate ends can be produced by reacting the glycol with excess phosgene, and isocyanate ends can be provided by reacting the glycol with a diisocyanate.

In addition to the above, among others the macromolecular intermediate may be a polymer containing amide type linkage. By the expression "amide-type linkages" is meant that the molecule contains between recurring units linkages represented by the formula

wherein —A— is a member of the class consisting of

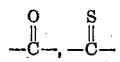

and

and R is hydrogen, lower alkyl, and lower alkylene when the diamine has a ring structure. Polyesters are also suitable.

The polyfunctional essentially monomeric organic polymer intermediate may be any polymer-forming molecule capable of existing in the vaporous state without substantial decomposition and corresponding to the formulae $$(Z)_m-(X)_n$$

and $$(Z)_m-(Y)_n$$

wherein $n$ is a small integer of at least two, X is hydrogen more active than alcoholic hydrogen, Y is methyl oxalate, phenyl oxalate or a group capable of reacting with alcohol at room temperature to form an ester, Z is an organic radical and $m$ is a small number at least 1. Among such materials may be mentioned alkylene diamines such as ethylene diamine, propylene diamine, hexamethylene diamine, as well as phenylene diamine, diaminocyclohexane, diethylene triamine, adipyl chloride, sebacyl chloride, terephthaloyl chloride, phenols such as resorcinol, the bis chloroformates of the alkylene glycols, dimethyl oxalate, diphenyl oxalate and the like.

The shaped bodies of the present invention are of continuous and uniform cross section, i.e., they are solid without soft or open centers. If desired, their stability can be improved by incorporating commercially available anti-oxidants and ultra-violet light stabilizers. An advantage, particularly for filaments, is that elastic solid structures are obtained by a simple process. A large percentage of the rubber threads used are prepared by slitting rubber sheets. This procedure relatively large denier filaments, which cannot be converted readily into multifilaments and are not acceptable for many uses, particularly in certain fabrics.

In general, the process of this invention provides a very useful tool for preparing films and fibers comprising high molecular weight polymers. The process circumvents many of the normal steps required for converting polymeric materials into useful shaped articles. It provides a method for preparing elastic polymers of sufficiently high molecular weight at room temperatures that the shaped articles are useful. Also, intermediates which would normally be too impure for conventional melt polymerization can be used. In addition, there is no need to maintain a delicate balance of materials in order to obtain high molecular weight polymer, as is required by melt polymerization. There is also provided a new method for preparing films and filaments comprising certain cross-linked polymers.

Many equivalent modifications will be apparent to those skilled in the art from a reading of the above description without a departure from the inventive concept.

What is claimed is:

1. A process which comprises forming a solid shaped body of continuous cross section by combining at least two complementary reactive intermediates, one of which contains at least two active hydrogens, more reactive than alcoholic hydrogen, whereas its complement contains at least two reactive groups selected from the class consisting of a group capable of reacting with alcohol at room temperature to form an ester, the methyl oxalate group and the phenyl oxalate group and at least one of the said complementary reactive polymer intermediates being a multifunctional organic macromolecule of recurring units and at least one of the said complementary intermediates being monomeric and vaporous, the combination of the said complementary intermediates being accomplished by extruding the macromolecular intermediate through an orifice blanketed by an inert gas, into the vapors of the monomeric intermediate; the said macromolecular intermediate being extruded as an extrudate having a viscosity of at least about 20 poises.

2. The process of claim 1 wherein the macromolecular intermediate is essentially a polyamide.

3. The process of claim 1 wherein the macromolecular intermediate is essentially a polyurethane.

4. The process of claim 1 wherein the active hydrogens more active than alcoholic hydrogen are supplied by the mercaptan radical.

5. The process of claim 1 wherein the active hydrogens more active than alcoholic hydrogen are supplied by an amino —NHR radical wherein R is a member selected from the class consisting of hydrogen and alkyl.

6. The process of claim 1 wherein the active hydrogens more active than alcoholic hydrogen are supplied by a primary amino radical.

7. The process of claim 1 wherein the reactive groups capable of reacting with alcohol at room temperature to form an ester are isocyanate.

8. The process of claim 1, wherein the complementary reactive intermediates combine to form an amide.

9. The process of claim 1 wherein the complementary reactive intermediates combine to form a urethane.

10. The process of claim 1 wherein the complementary reactive intermediates combine to form a urea.

11. The process of claim 1 wherein the complementary reactive intermediates combine to form an ester.

12. The process of claim 1 wherein each complementary reactive intermediate contains only two reactive groups.

13. The process of claim 1 wherein the monomeric intermediate contains reactive end groups selected from the class consisting of methyl oxalate and phenyl oxalate.

14. The process of claim 1 wherein the monomeric intermediate is an alkylene diamine and the macromolecular intermediate contains a long chain polyether group and isocyanate end groups.

References Cited in the file of this patent

UNITED STATES PATENTS

| | | |
|---|---|---|
| 1,881,742 | Lilienfeld | Oct. 11, 1932 |
| 2,252,689 | Bradshaw | Apr. 19, 1941 |
| 2,425,782 | Bludworth | Aug. 19, 1947 |
| 2,460,546 | Stephanoff | Feb. 1, 1949 |
| 2,708,617 | Magat | May 17, 1955 |
| 2,813,775 | Steuber | Nov. 19, 1957 |
| 2,813,776 | Koller | Nov. 19, 1957 |